(12) United States Patent
Crittin et al.

(10) Patent No.: US 11,562,538 B2
(45) Date of Patent: Jan. 24, 2023

(54) METHOD AND SYSTEM FOR PROVIDING A USER INTERFACE FOR A 3D ENVIRONMENT

(71) Applicant: TIME2MARKET SA, Bellevue (CH)

(72) Inventors: Gérard Philibert Crittin, Port-Valais (CH); Camille Cottagnoud, Sion (CH); Matthieu Claude Léon Garrigues, Saint Denis (FR); Lionel Robert Daniel Crassier, Geneva (CH)

(73) Assignee: Time2Market SA, Bellevue (CH)

( * ) Notice: Subject to any disclaimer, the term of this patent is extended or adjusted under 35 U.S.C. 154(b) by 0 days.

(21) Appl. No.: 16/629,154

(22) PCT Filed: Jul. 8, 2018

(86) PCT No.: PCT/EP2018/068460
§ 371 (c)(1),
(2) Date: Jan. 7, 2020

(87) PCT Pub. No.: WO2019/008186
PCT Pub. Date: Jan. 10, 2019

(65) Prior Publication Data
US 2020/0226833 A1   Jul. 16, 2020

Related U.S. Application Data

(60) Provisional application No. 62/529,633, filed on Jul. 7, 2017.

(51) Int. Cl.
*G06T 19/00* (2011.01)
*G06F 3/0481* (2022.01)
*G06F 3/04815* (2022.01)
*G06T 19/20* (2011.01)

(52) U.S. Cl.
CPC ........ *G06T 19/003* (2013.01); *G06F 3/04815* (2013.01); *G06T 19/20* (2013.01)

(58) Field of Classification Search
CPC .... G06T 19/003; G06T 19/20; G06F 3/04815
See application file for complete search history.

(56) References Cited

U.S. PATENT DOCUMENTS

| | | | |
|---|---|---|---|
| 10,284,794 B1 * | 5/2019 | Francois | .................. G06K 9/46 |
| 2008/0106594 A1 | 5/2008 | Thrun | |
| 2010/0302280 A1 * | 12/2010 | Szeliski | .................. G06T 13/80 |
| | | | 345/660 |
| 2011/0279445 A1 | 11/2011 | Murphy et al. | |
| 2012/0008916 A1 | 1/2012 | Lane | |

(Continued)

OTHER PUBLICATIONS

International Search Report for PCT/EP2018/068460 dated Nov. 16, 2018, 2 pages.

(Continued)

*Primary Examiner* — Michelle Chin
(74) *Attorney, Agent, or Firm* — Nixon & Vanderhye, P.C.

(57) ABSTRACT

A method is shown for providing a user interface for a 3D environment of 360° images. The method includes displaying a first 360 degree image in a sequence of 360 degree images; receiving user input to interact with one of a plurality of points of interest detected within the first 360 degree image; and processing the interaction. Each point of interest is associated with a 3D coordinate. A system and software are also disclosed.

22 Claims, 5 Drawing Sheets

(56) References Cited

U.S. PATENT DOCUMENTS

| | | | |
|---|---|---|---|
| 2013/0222369 A1 | 8/2013 | Huston et al. | |
| 2014/0243596 A1* | 8/2014 | Yoon | A61B 1/00009 |
| | | | 600/111 |
| 2018/0341811 A1* | 11/2018 | Bendale | G06K 9/3233 |
| 2019/0020802 A1* | 1/2019 | Melkote Krishnaprasad | |
| | | | G06T 5/50 |

OTHER PUBLICATIONS

Written Opinion of the ISA for PCT/EP2018/068460 dated Nov. 16, 2018, 6 pages.

* cited by examiner

METHOD AND SYSTEM FOR PROVIDING A USER INTERFACE FOR A 3D ENVIRONMENT

This application is the U.S. national phase of International Application No. PCT/EP2018/068460 filed Jul. 8, 2018 which designated the U.S. and claims priority to U.S. Provisional Patent Application No. 62/529,633 filed Jul. 7, 2017, the entire contents of each of which are hereby incorporated by reference.

FIELD OF INVENTION

The present invention is in the field of user interfaces. More particularly, but not exclusively, the present invention relates to user interfaces for 3D environments.

BACKGROUND 3D environments created from 3D graphics are well-known in computer games and virtual reality.

However, 3D environments can also be created from a relatively new commodity—360° cameras.

To improve the immersive experience of 3D environments created from 360° cameras, there is a desire to augment the 3D environments with additional content.

Matterport provides a technology which uses a proprietary camera with an optical lens and several sensors (Infra-Red signals and gyroscope), to enable capture of a succession of (non 360°) pictures, distances and colour measurements by rotating the hardware around the vertical axis of a pod on a single place of a scene. Repeating this operation every metre apart in the scene, Matterport software builds stitched 360° images for every place and a corresponding 3D mesh for the whole scene. A user can move to different locations within the 3D mesh and the 360° image for that approximate location is displayed to the user. A morphing animation is displayed between the previously displayed and new 360° image.

Text tags can be added to the 3D mesh during configuration. This process can be difficult if the 3D mesh does not map to the 360° image accurately which can occur if the light is too strong or during use outdoors.

A user when viewing a displayed 360° picture, is displaying indicators which enable the user to select text tags for display.

There is a desire for method and system which provides for a more robust and simpler technology to enable user to more effectively interact with 3D environment comprising 360° images.

It is an object of the present invention to provide a method and system for providing a user interface for 3D environments which overcomes the disadvantages of the prior art, or at least provides a useful alternative.

SUMMARY OF INVENTION

According to a first aspect of the invention there is provided a method for providing a user interface for a 3D environment, including:
a) displaying a first 360 degree image in a sequence of 360 degree images;
b) receiving user input to interact with one of a plurality of points of interest detected within the first 360 degree image; and
c) processing the interaction;
wherein each point of interest is associated with a 3D coordinate.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for interacting with 3D environments of 360° images.

The inventors have discovered that points of interest can be detected within 3D images. These points of interest can then be provided to a user to interact with, for example, to attach content or to view attached content. Furthermore, in one embodiment of the invention, the inventors have discovered that by providing a sequence of 360 degree images, movement by a user can follow a guided path, simplifying interaction.

Figure 1:
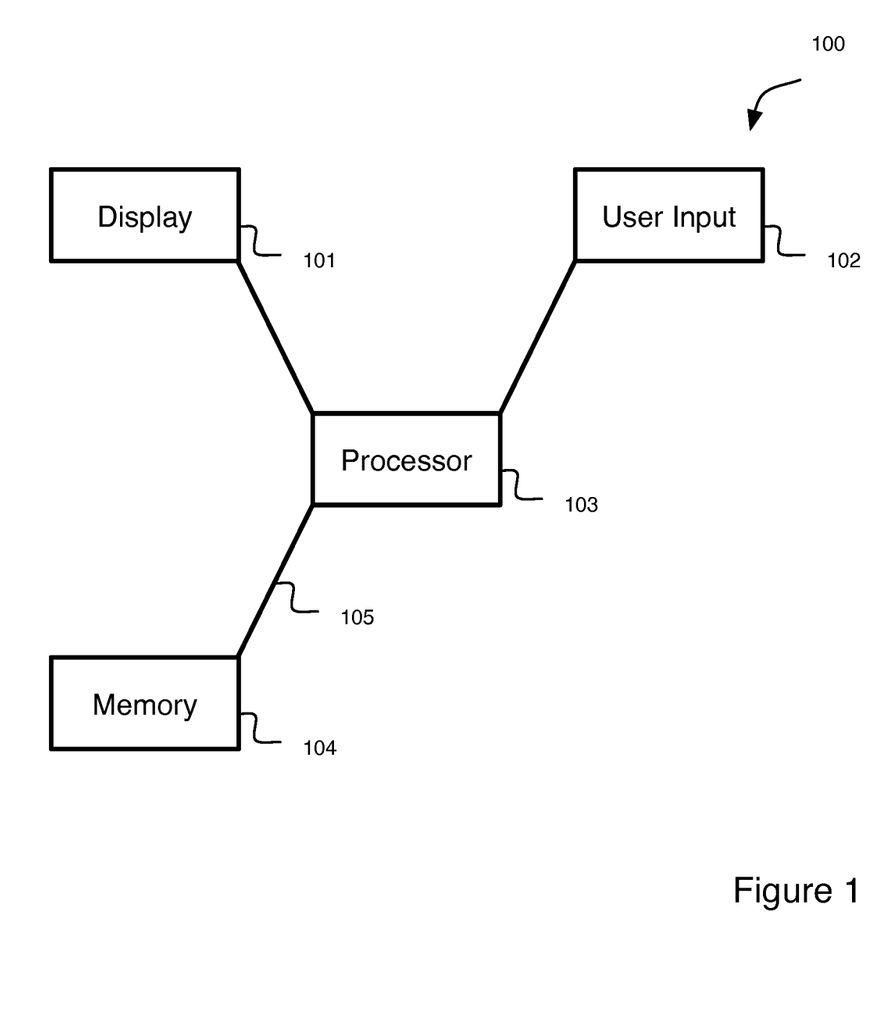
FIG. 1: shows a block diagram illustrating a system in accordance with an embodiment of the invention.

In FIG. 1, a system 100 in accordance with an embodiment of the invention is shown.

A display 101 is shown. The display 101 is configured to display a 360 degree image from a sequence of 360 degree images.

The sequence of 360 images may be captured from a real-world scene using a 360 degree camera. It will be understood that a 360 degree camera may comprise a series of generally spherically oriented lens and image sensors configured to capture a series of images from a scene which may then be stitched together to generate a 360 degree image of the scene. In an alternative embodiment, the 360 degree camera may comprise a single lens and image sensor configured to capture multiple images in different orientations and stitch the captured images together to form a 360 degree image. In another embodiment, the 360 degree camera may comprise two fish-eye lens which capture two 180 images (or 180-220 degree images in some embodiments) which are stitched together to form a 360 degree image.

It will be understood that where the terms 360 degree image or 180 degree image are used, the image may not capture the entire 360 or 180 view surrounding the horizontal plane around the camera and may not capture the entire 360 or 180 view surrounding the vertical plane around the camera. For example, in one embodiment, the 360 image may capture a sphere surrounding the camera except for a bottom portion of the sphere.

The 360 degree camera may be a 360 degree video camera. The camera may be moved along a path within a real-world environment to capture the sequence of 360 degree images through-out the path.

The display 101 may be, for example, an electronic display such as a touch-screen display, OLED display, LED display, or any other type of electronic display. The display 101 may be a panel display such as a computer screen, television screen, or portable device screen (such as a tablet or smartphone), or a wearable display such as an augmented reality (AR), mixed reality (MR), or virtual reality (VR) headset.

A user input 102 is shown. The user input 102 is configured to receive input from a user to interact with at least one of a plurality of points of interest detected within the displayed 360 degree images.

The user input 102 may be a pointer device such as a mouse, touch-screen, track pad, or AR/MR/VR controller, a sensor based input such as visual, IR, laser, or other sensor based input, microphone or any other type of user input.

A processor 103 is shown. The processor 103 may be configured to control the display 101, user input 102 and/or memory 104. The processor 103 may be further configured to process the interaction with the plurality of points of interest.

It will be appreciated that the processor 103 may comprise multiple processors, for example, multi-core or connected processor infrastructures.

A memory 104 is shown. The memory 104 may be local to the processor 103 and connected 105 via a bus to the processor 103 or the memory 104 may be remote from the processor 103 and connected 105 via a communications system (such as a network controller and a network or internetwork) to the processor 103. Where the memory 104 is connected via a communications system, the memory 104 may reside at a server apparatus (not shown).

The memory 104 may be configured to store the sequence of 360 degree images and points of interest with associated 3D coordinates.

The display 101, user input 102, processor 103, and/or memory 104 may be connected or co-located within the same apparatus such as a computing apparatus. The computing apparatus may be a desktop, laptop, tablet, or smartphone device.

Figure 2:
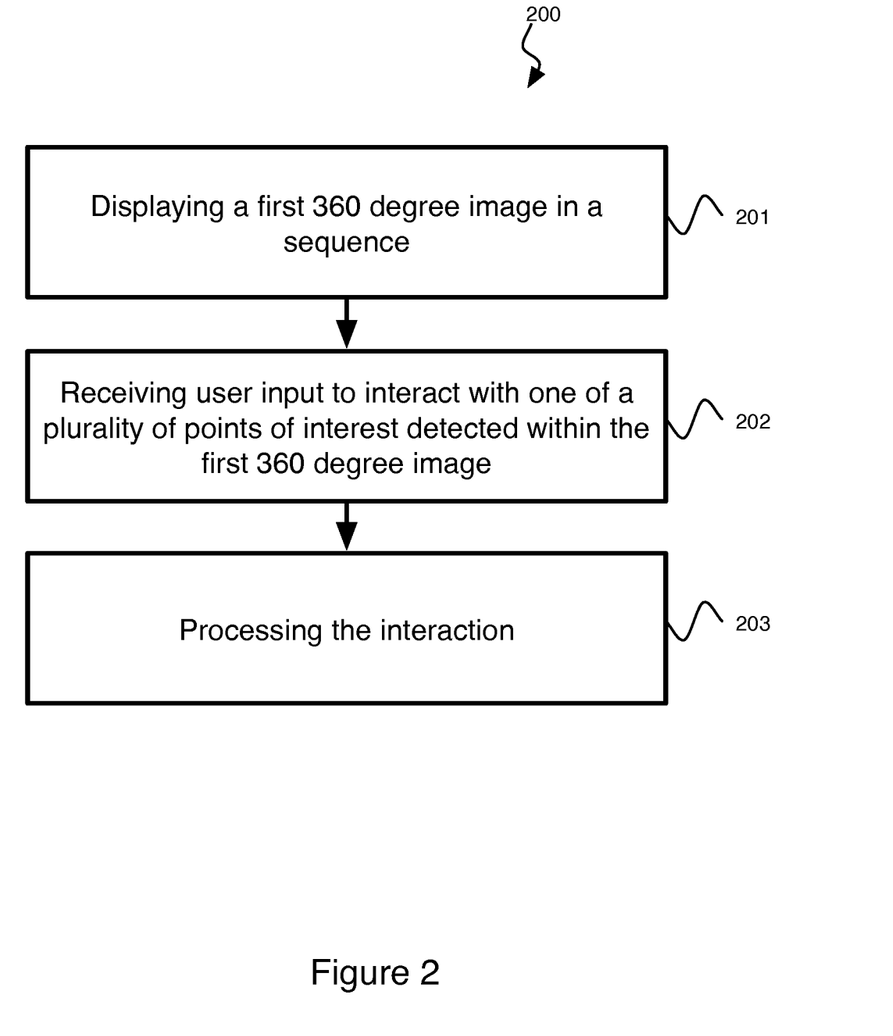
FIG. 2: shows a flow diagram illustrating a method in accordance with an embodiment of the invention.

Referring to FIG. 2, a method 200 for providing a user interface for a 3D environment in accordance with an embodiment of the invention will be described.

In step 201, a 360 degree image from a sequence of 360 images (e.g. as described in relation to FIG. 1) is displayed (e.g. on display 101) to a user within a user interface.

In step 202, input is received from a user within the user interface (e.g. via user input 102) to interact with one of plurality of points of interest detected within the 360 degree image. Each point of interest is associated with a 3D coordinate.

The plurality of points of interest may be detected via one or more processors using node vectorization. For example, points of interest may be detected within a first 360 degree image using an image processing method (e.g. detecting points using visual characteristic analysis (such as contrast analysis) on a proximate group of pixels); these points of interest may be mapped to corresponding points of interest similarly detected within a second 360 degree image; and each point of interest and corresponding point may be triangulated to generate a 3D coordinate for each point of interest.

In step 203, the interaction may be processed (e.g. by processor 103).

The interaction may involve content, such as text, photos or images, PDFs, video, 3D objects, 360 degree pictures or video, data to download such as files, webpages, sensor data, or links to web resources or content such as URLs or URIs.

The interaction may include associating of content with the point of interest by the user.

Association of content may involve a series of user interface steps. For example:

a) selection of an indicator representing the point of interest;
b) selection or creation of content to associate with the point of interest; and/or
c) positioning the indicator to set or change its 3D relationship with the 3D coordinates of the point of interest.

The interaction may include activation of content associated with the point of interest by the user.

Activation of the content may involve a single action, such as a single or double-click or touch event or mouse over or click on a (specific to the content) link from an external application, to display or actuate the content. The single action may involve the user input occurring at or near the indicator within the user interface.

In one embodiment, user input may be received to move forward or backward within the sequence of 360 degree images and the corresponding 360 image of the sequence may be displayed to the user to be interacted with in accordance with steps 202 and 203.

In some embodiments, the interaction may include associating of another location within a 3D environment or another 3D environment. The interaction may include activation of the location associated with the point of interest by the user (for example, by single or double-clicking or any other user input method). Activation of the location may include "teleportation" of the user to a 360 degree image associated with the location. The location may be another point of interest within the associated 360 degree image. The location may include orientation information so that when the user is "teleported" to the 360 degree image, the viewpoint of the user is directed towards a point of interest in accordance with an orientation.

In some embodiments, the user interface exists in two versions: a creator version and a navigator version. In the creator version, a user can both associate content with a point of interest and activate content associated with a point of interest. In the navigator version, a user cannot associate content with a point of interest but can activate content associated with a point of interest.

In some embodiments, one or more of the parameters associated with the content includes a static link such as a URI. This link may be shared in an external application. Clicking on this link may open the 3D application and take a user to a 360 degree image containing the associated point of interest and orientate the user towards the point of interest. In this way, a link to the content can enable a user to see the content in context within the 360 degree image. In some embodiments, the links may include geographic or other location information enabling the links to be positioned within a map such as a 2D map or 3D map or floorplan. The links may be represented via an icon or other visual element within the map. When this icon or element is selected by a user, the link is accessed and the user is then taken to the 360 degree image as described above.

Figure 3:
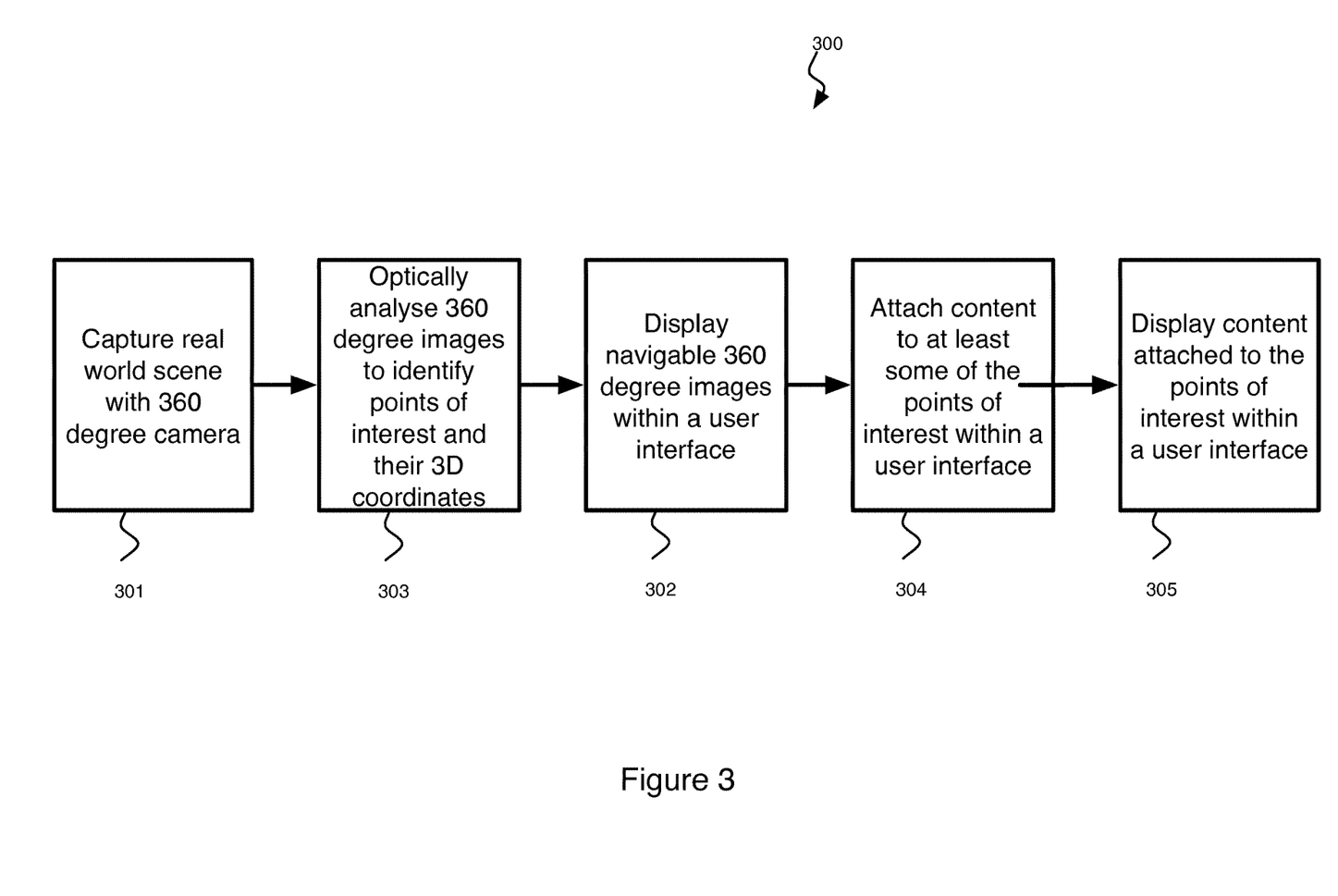
FIG. 3: shows a flow diagram illustrating a method in accordance with an embodiment of the invention.

Referring to FIG. 3, a method 300 for providing a user interface for a 3D environment in accordance with an embodiment of the invention will be described.

In this embodiment, a real world scene that is filmed with a 360° camera (in step 301) may be viewed online (in step 302) (in some embodiments, online is an online application or local application, or offline in a local application) in a user interface provided by a video or image player that allows a user to move immersively (forward, backward) at his own pace and to look around/up/down in the 360° images and zoom in/out. A 360° image, in this embodiment, is a full sphere picture except a small area below the camera where an operator of the camera was positioned while capturing the 360° images.

The 360° images may be analyzed both individually and collectively using optical analysis (in step 303). This analysis results in the identification of the points of interest of the scene. The nodes coordinates for the points of interest are calculated in a 3D local referential.

Augmented multimedia content may be attached (in step 304) directly in the 360° vectorized images by association to these pre-calculated nodes, and can be accessed, viewed and edited by an online user (in step 305) (or offline in some embodiments).

Associating a content to a specific point in the image may be performed through a three-click process:
1) selecting the icon on which the user will click (or provide other user input such as double-click or touch event in some embodiments) to access the content; icons are either 2D images or 3D models from an application library;
2) associating a content to the selected icon; a content may be a text created in a text editor; or a photo, a video, a 360° photo, a 360° video, a pdf file, or any other type of file, to be downloaded from the computer or a server; or a website/file/webcam/sensor URL to be typed in the URL editor; or a teleportation link to a content or scene; and
3) associating an icon and its content to a precalculated node of the scene; a widget is provided to enable movement of the icon and its content around the node in 3 dimensions to allow accuracy in the positioning of the icon.

In some embodiments, the icon, content and position can be modified after the content is associated to the specific point in the image.

Reading the content may be a single- or double-click on the icon or a mouse-over or a speech (vocal recognition) or an image recognition.

A teleportation feature within the user interface enables a user to move instantly to a location in a 360° immersive environment from a list of bookmarked places.

Another teleportation feature within the user interface enables a user to move instantly to the location of a geopositioned content in the scene when selecting it from the list of existing contents.

The user interface to view the 360° images and their associated multimedia content may be accessed through offline or online applications. The 360° images may be preloaded in the application or may be loaded in real time from a server or a cloud. The multimedia content may be accessed offline on the device of the user, or online from a proprietary database, or a client based database or an external cloud, and according to read/write access rights of the user. The augmented immersive environment may, therefore, be shared with authorized users.

The invention may, for example, use Unity or Unity3D as a 3D environment platform allowing to load the 360° images, to move immersively and to create and read the geopositioned content within the 360° images. It will be appreciated that a variety of 3D environment platforms could be used in place of Unity to perform similar function.

In some embodiments of the invention, additional functionality is provided, such as linking an object (or point of interest) in a 360° image of a scene to an other object (or point of interest) in another 360° image of the same scene or another scene; for example linking a valve to its corresponding machine in another machine room.

In some embodiments of the invention, a click, or gesture, on content could lead to the display of a gallery of locations containing the same content.

In some embodiments, the icon includes a dynamic display for the content associated with the icon. That is, all or a part of the content is displayed and/or can be interacted with by the user within the 360 degree image.

Figure 4:
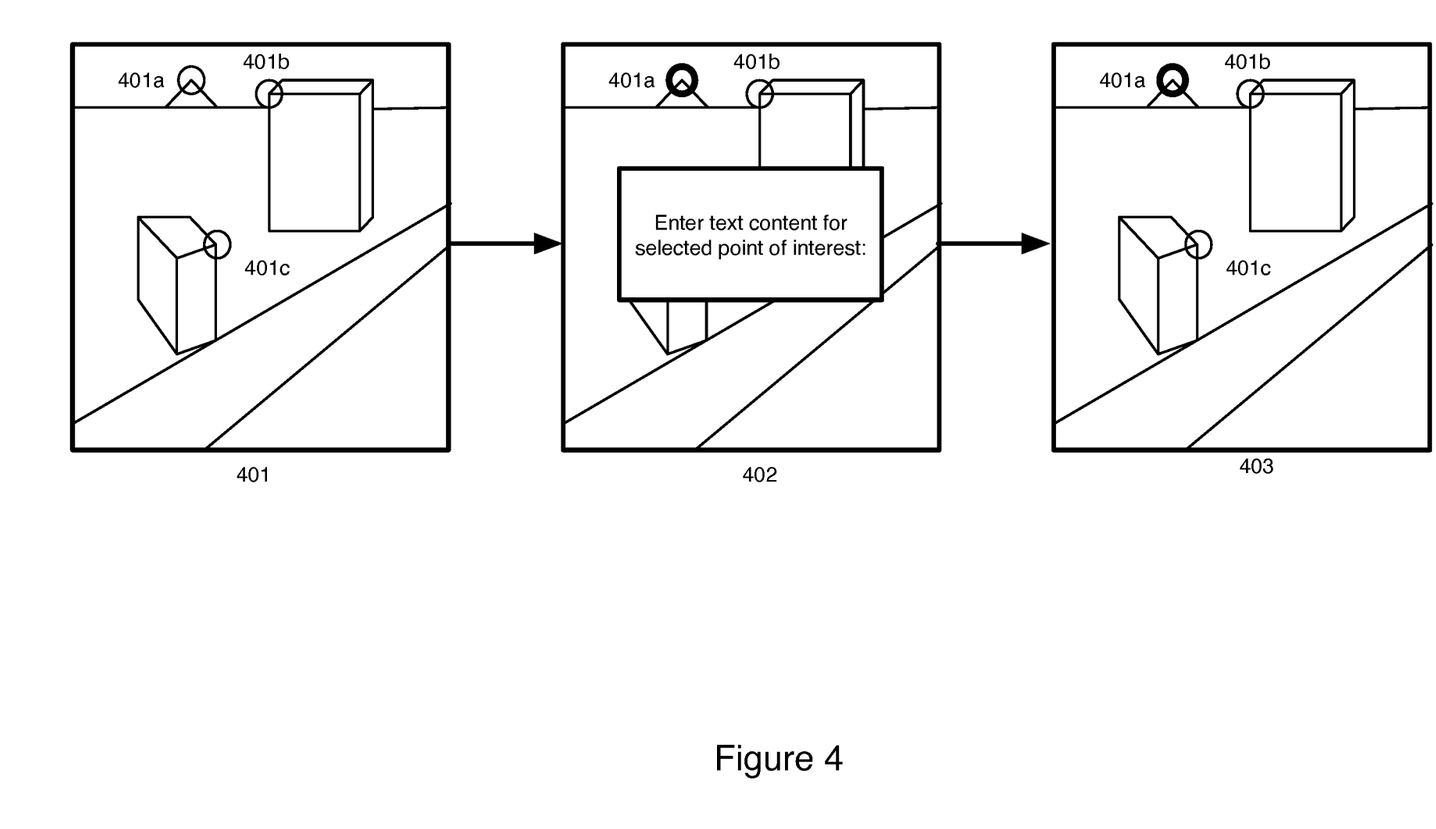
FIG. 4: shows a diagram illustrating user selection of a point of interest and association of content in a 360 degree image in accordance with an embodiment of the invention.

FIG. 4 shows a sequence of screenshots illustrating selection of a point of interest by a user and association of content with that point of interest in accordance with an embodiment of the invention.

In screenshot 401, a portion of 360 degree image generated from a view point into the 360 degree image is displayed within a user interface to a user on a display. The user interface provides for the user to rotate the viewpoint into the 360 degree image so as to show other portions of the 360 degree image. A series of indicators, 401a, 401b, 401c may be displayed within this portion. Each indicator may correspond to a point of interest within the 360 degree image. Each point of interest is associated with a 3D coordinate and, therefore, the indicators may be scaled to represent the Z location relative to the viewpoint. The indicators may be a 2D image, 3D model, or another visual characteristic, such as modification of a portion of underlying 360 degree image (e.g. a halo). Each of indicators may be selected by the user.

In screenshot 402, a user has selected indicator 401a. A window is shown within the user interface to enable a user to create or assign existing content to the point of interest associated with the selected indicator 401a.

In screenshot 403, the content has been assigned to the indicator 401a. The user interface may enable the user to reposition the 3D coordinates of the indicator.

Figure 5:
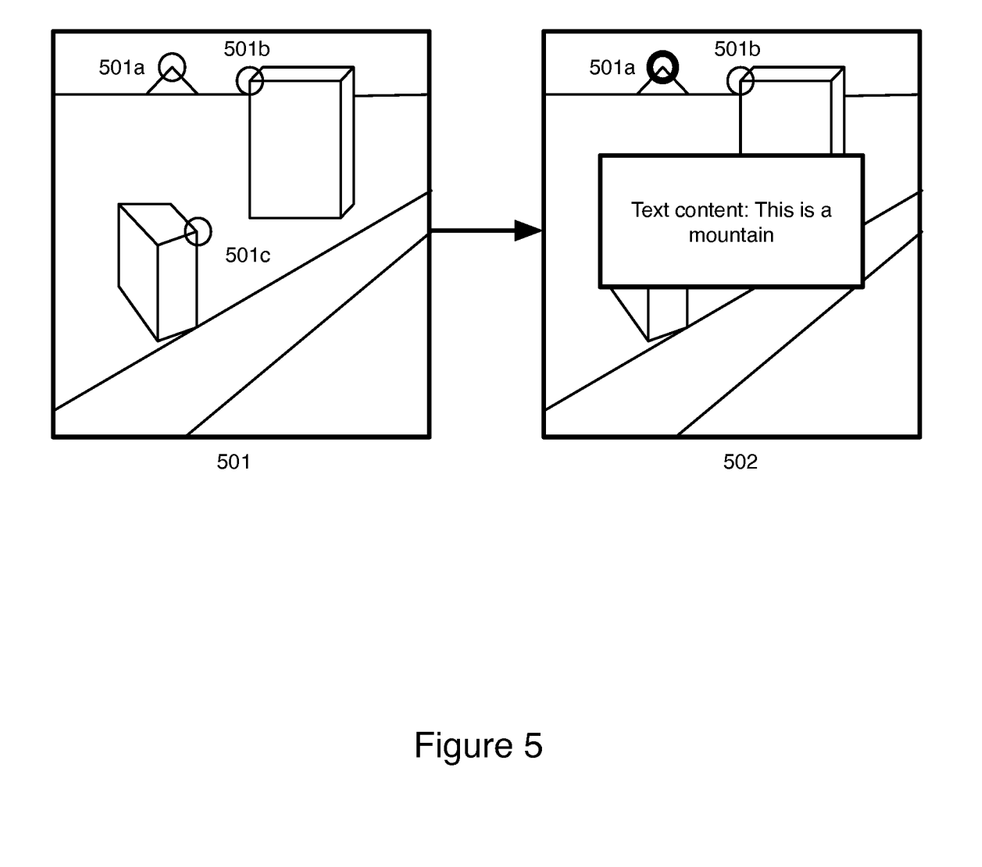
FIG. 5: shows a diagram illustrating user selection of a content indicator at a point of interest and activation of the content within a 360 degree image in accordance with an embodiment of the invention.

FIG. 5 shows a sequence of screenshots illustrating selection of an indicator for content of point of interest by a user and activation of that content in accordance with an embodiment of the invention.

In screenshot 501, a portion of 360 degree image generated from a view point into the 360 degree image is displayed within a user interface to a user on a display. The user interface provides for the user to rotate the viewpoint into the 360 degree image so as to show other portions of the 360 degree image. A series of indicators 501a, 501b, 501c may be displayed within this portion. Each indicator may correspond to a point of interest within each of the 360 degree image. Each point of interest is associated with a 3D coordinate and, therefore, the indicators may be scaled to represent the Z location relative to the viewpoint. The indicators may be a 2D image or 3D model. Each of the indicators may be selected by the user. At least one or all of the points of interest associated with the visible indicators may be associated with content. In one embodiment, indicators that are beyond a Z distance threshold from the viewpoint are not displayed for selection.

In screenshot 502, a user has selected indicator 501a. A window is shown within the user interface to enable a user to view content associated with the point of interest associated with the selected indicator 501a.

Potential advantage of some embodiments of the present invention are that user interaction with a displayed 3D environment is simplified by provision of detected points of interest instead of only a 3D mesh, and the detected points of interest are more likely to correspond to the 3D mesh, therefore, improving positioning of indicators within a 3D environment.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method performed by a processing system for providing a user interface for a 3D environment, including:
    displaying a first 360 degree image in a sequence of 360 degree images captured by a camera moved along a path, wherein each image in the sequence of the 360 degree images is captured at a different time as the camera is moved along the path and a different location of the camera along the path from locations of the camera at which the other images of the sequence of 360 degree images are captured;
    detecting a plurality of points of interest in the first 360 degree image based on visual characteristic analysis of the first 360 degree image;
    determining points of interest in other images of the sequence of 360 degree images corresponding to the plurality of points of interest in the first 360 degree image;
    determining three-dimensional (3D) coordinates for each of the plurality of points of interest using triangulation of the positions of the plurality of points of interest in the first 360 degree image captured at a first location of the camera along the path and the positions of the corresponding points of interest in other images of the sequence of 360 degree images captured at locations along the path that are different from the first location;
    receiving a user input to move forwards and backwards along the path and displaying the 360 degree image in the sequence of the 360 degree images captured at that location on the path;
    for one or more of the plurality of points of interest, displaying an indicator in the first 360 degree image and the sequence of 360 degree images, a position of the indicator related to the point of interest in the first 360 degree image and the sequence of 360 degree images;
    receiving a user input to interact with the indicator in one of the first 360 degree image and the sequence of 360 degree images; and
    processing the interaction based on information associated with the indicator in response to receiving the user input.

2. A method as claimed in claim 1, wherein the interaction includes associating content with the indicator.

3. A method as claimed in claim 2, wherein the content is one or more selected from the set of single type content, multimedia content, and real world object interaction content.

4. A method as claimed in claim 1, wherein the interaction includes activating content associated with the indicator.

5. A method as claimed in claim 1, further comprising receiving navigation instructions for navigating the 3D environment in the sequence of 360 degree images and displaying the sequence of 360 degree images based on the received navigation instructions, and wherein processing the interaction based on the information associated with the indicator in response to receiving the user input includes teleporting the user to another 360 degree image of the sequence of 360 degree images associated with the point of interest.

6. A method as claimed in claim 1, wherein the indicator is scaled within the display based upon the 3D coordinates of the point of interest.

7. A method as claimed in claim 6, wherein the indicator is one selected from a set of 2D images and 3D model.

8. A method as claimed in claim 1, wherein the 360 degree images are real-world images.

9. A method as claimed in claim 8, wherein the 360 degree images are captured by a 360 degree camera.

10. A method as claimed in claim 9, wherein the 360 degree camera is a 360 degree video camera.

11. A method as claimed in claim 1, wherein each of the sequence of 360 degree images is associated with a location.

12. A method as claimed in claim 11, wherein the locations between the 360 degree images differ.

13. A method as claimed in claim 12, wherein the locations between the 360 degree images differ by less than 15 centimeters.

14. A method as claimed in claim 1, wherein the sequence of 360 degree images is a 360 degree video.

15. A method as claimed in claim 1, wherein the indicator to which the user input is received is associated with one of the images of the sequence of 360 degree images, and the processing the interaction based on the information associated with the indicator in response to receiving the user input includes displaying the image associated with the indicator.

16. A method as claimed in claim 1, wherein the indicator to which the user input is received is associated with location information and viewpoint information, and the processing the interaction based on the information associated with the indicator in response to receiving the user input includes displaying an image from the sequence of 360 degree images based on the location information and viewpoint information.

17. A method as claimed in claim 1, wherein the plurality of points of interest are detected using node vectorization.

18. A method as claimed in claim 1, wherein each of the images in the sequence of 360 degree images is captured by a same camera.

19. A method as claimed in claim 1, wherein the camera is a real camera and the sequence of 360 degree images are images of a real world.

20. A method as claimed in claim 1, wherein the camera is a virtual camera and the sequence of 360 degree images are images of a virtual scene.

21. A system for providing a user interface for a 3D environment, including:
    a display configured for displaying a first 360 degree image in a sequence of 360 degree images captured by a camera moved along a path, wherein each image in the sequence of the 360 degree images is captured at a different time as the camera is moved along the path and a different location of the camera along the path from locations of the camera at which the other images of the sequence of 360 degree images are captured;

a user input configured for receiving input from a user to interact with one of a plurality of indicators associated with one of a plurality of points of interest detected within the first 360 degree image; and a processor configured to control the system to:
  detect the plurality of points of interest in the first 360 degree image based on visual characteristic analysis of the first 360 degree image;
  determine points of interest in other images of the sequence of 360 degree images corresponding to the plurality of points of interest in the first 360 degree image;
  determine three-dimensional (3D) coordinates for each of the plurality of points of interest using triangulation of the positions of the plurality of points of interest in the first 360 degree image captured at a first location of the camera along the path and the positions of the corresponding points of interest in other images of the sequence of 360 degree images captured at locations along the path that are different from the first location;
  receive a user input to move forwards and backwards along the path and control the display to display the 360 degree image in the sequence of the 360 degree images captured at that location on the path;
  for one or more of the plurality of points of interest, display an indicator in the first 360 degree image and the sequence of 360 degree images, a position of the indicator related to the point of interest in the first 360 degree image and the sequence of 360 degree images;
  receive a user input to interact with one of the indicators; and
  process the interaction based on information associated with the indicator in response to receiving the user input.

22. A non-transitory computer readable medium having stored therein a computer program for execution by a computer, the computer program, when executed, causes the computer to:

display on a display a first 360 degree image in a sequence of 360 degree images captured by a camera moved along a path, wherein each image in the sequence of the 360 degree images is captured at a different time as the camera is moved along the path and a different location of the camera along the path from locations of the camera at which the other images of the sequence of 360 degree images are captured;

detect a plurality of points of interest in the first 360 degree image based on visual characteristic analysis of the first 360 degree image;

determine points of interest in other images of the sequence of 360 degree images corresponding to the plurality of points of interest in the first 360 degree image;

determine three-dimensional (3D) coordinates for each of the plurality of points of interest using triangulation of the positions of the plurality of points of interest in the first 360 degree image captured at a first location of the camera along the path and the position of the corresponding points of interest in other images of the sequence of 360 degree images captured at locations along the path that are different from the first location;

receive a user input to move forwards and backwards along the path and display the 360 degree image in the sequence of the 360 degree images captured at that location on the path;

for one or more of the plurality of points of interest, display an indicator in the first 360 degree image and the sequence of 360 degree images, a position of the indicator related to the point of interest in the first 360 degree image and the sequence of 360 degree images;

receive a user input to interact with the indicator; and process the interaction based on information associated with the indicator in response to receiving the user input.

* * * * *